Feb. 14, 1928.
J. N. MACDONALD
1,658,995
TIRE CHAIN TOOL
Filed April 27, 1925
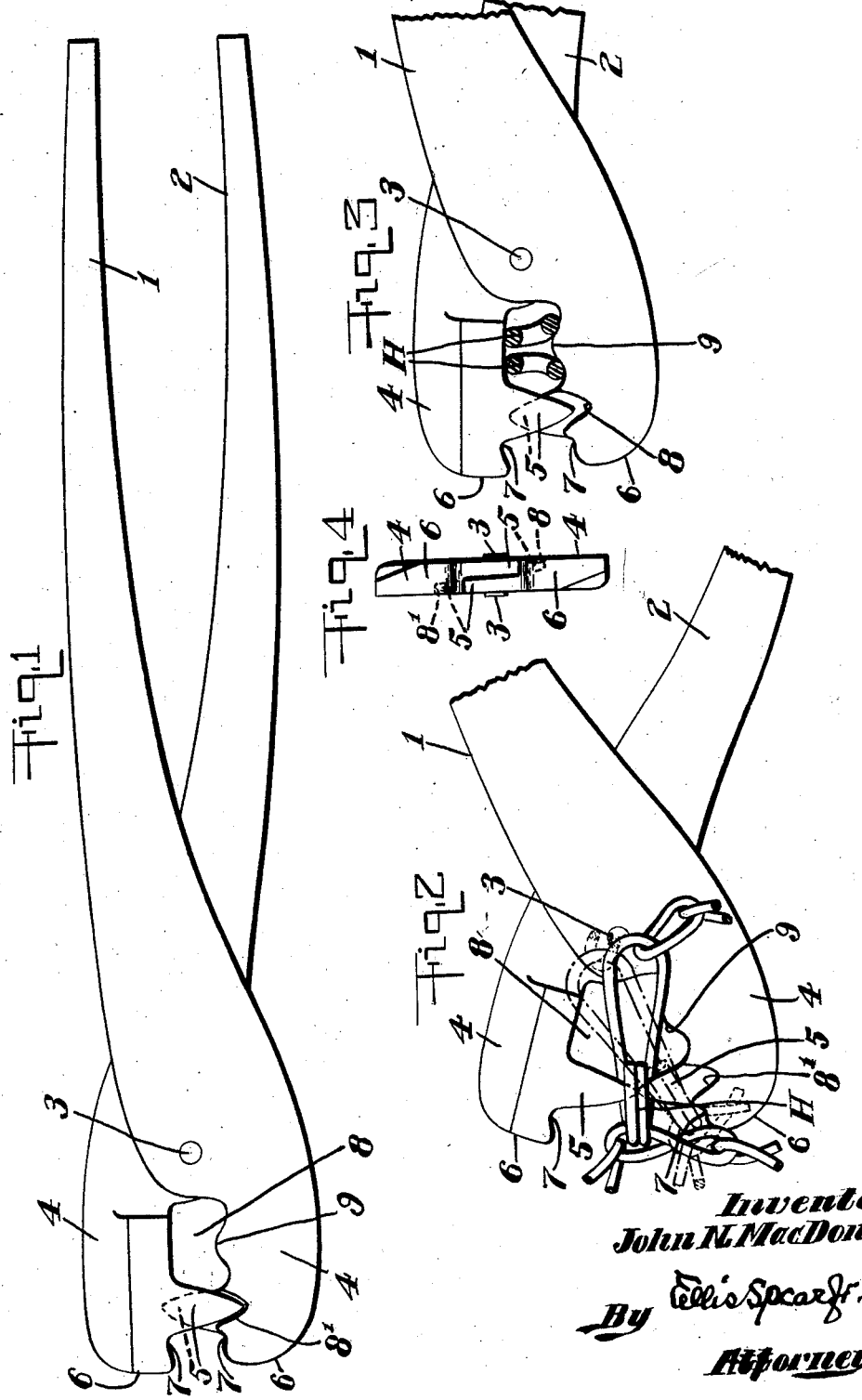
Inventor
John N. MacDonald
By Ellis Spear Jr.
Attorney Patented Feb. 14, 1928.

1,658,995

UNITED STATES PATENT OFFICE.

JOHN N. MACDONALD, OF WETHERSFIELD, CONNECTICUT, ASSIGNOR TO HENRY ST. PIERRE, OF WORCESTER, MASSACHUSETTS.

TIRE-CHAIN TOOL.

Application filed April 27, 1925. Serial No. 26,234.

This invention relates to automobile tire chain tools, and particularly to a tool for opening the end hooks of the cross chains when it is desired to replace a section of chain, and for closing the end hooks when the operation is completed.

My present invention involves certain improvements in the construction and positioning of the bills of the jaw members which are of advantage when opening and closing the end hooks or links, and a construction of the inner faces or offsets of the jaws so that the parallel pairs of hooks regardless of their diameter, are held in rigid and true vertical position when it is desired to compress and close them.

Many tools for this general purpose have heretofore been produced, but they have all, so far as I am aware, been provided with bills which overlapped at the extreme end of the jaws, and did not furnish any means of holding the hook straight, while being opened, other than that provided by the bills themselves. As will be readily appreciated, this frequently resulted in the distortion of the hook, making it difficult to neatly and completely close the same when the exchange of parts was effected. Nor, so far as I am aware, has there been heretofore produced a tool which might successfully be used with different size hooks and maintain the pairs in true vertical position while compressing and forcing them together to close the hooks. The hooks in all automobile chains when closed are circular in shape and the convex surface on the inner face of the jaw of my device makes it possible to use one tool for closing any hook regardless of its diameter.

While retaining all the advantages of the overlying jaw type of device, I arrange my wedging beaks or bills in opposed relation, spaced from the jaw ends, and adapted to pass and overlap each other, the extreme end of each beak entering a recess formed in the metal on the inner face of the opposing member. The inner faces of the jaws beyond the beaks constitute shoulders which may, if desired, be forced together upon a hook to close the same, each side singly or both at one time, depending on the depth of shoulder. These shoulders, however, more successfully close the hooks one member at a time. My jaw members just inwardly of the beaks but above the pivot are cut away to provide a recess, one of the vertical surfaces of which is curved to provide a convex surface which tends to keep the links in vertical alinement and centered as the jaws close upon them, hooks of small diameter being held between the more convex surface portion of one jaw and the opposing jaw near the center of the closing area, and hooks of larger diameter being accommodated by the less convex surface near the outer edges of the area. It will thus be seen that the distortion and spreading which so frequently occurs are avoided by the use of my device, regardless of the size hook being worked upon. Thus my tool as shown is provided with two closing areas either of which may be used as desired, or the tool may be made with but one of these closing areas.

In the drawings I have shown a form of my device which I have found well adapted to practical use and which well illustrates the principles involved in my invention.

Throughout the specification and drawings, like reference numerals are used to indicate corresponding parts, and in the drawings:

Fig. 1 is a view of my chain tool in substantially closed position showing the relation of parts.

Fig. 2 shows the jaws of the tool working upon a pair of chain hooks to open the same.

Fig. 3 shows the tool in use to reclose a hook.

Fig. 4 is an end view showing the interlocking relation of the members.

My tool comprises a pair of unitary crossed handle members 1 and 2 pivoted at 3.

Each member at its operating end is provided with jaws 4 having beaks 5, which as shown may be of substantially triangular construction, slightly spaced from the extreme ends 6 of the jaws so that between each beak 5 and the end 6 of the jaw 4 is provided an inwardly facing bearing surface 7 for the hook or link H which may be worked upon, these oppositely disposed bearing surfaces tending to hold the hook in horizontal position so that the beaks may enter and expand the same, and serving to prevent relative movement of the link on the beaks as the beaks are pressed towards each other to open the link, these same shoulders, if desired, may be used as closing members for the hook H, in which case one half of the hook may be inserted between the shoulders and pressure applied to the handle members to close the hook. The other half of the hook may then be inserted and closed in the same manner. If the bearing surfaces or shoulders 7 are deep enough it is obvious that both portions of the hook may be closed simultaneously. The shoulders 7, therefore, have a double function in the use of the tool. In opening a hook, these shoulders serve as abutments against one or the other of which the hook may bear while it is being spread by the wedge formed beaks 5. In closing a hook, these shoulders may, if desired, be used as the closing jaws themselves, the hook resting lightly on the beaks 5.

The beaks 5 are offset to permit overlapping of one upon the other, and to the rear of each offset surface is provided a recess 8' into which enters the extreme ends of the beaks 5 when the tool is not in use, or when it may be opening a hook or link and the beaks have entered and crossed therein.

Between the pivots 3 and the bottom of the beaks 5 the jaws 4 are shaped to form a recess 8 the walls of which are adapted to close upon and compress the hook into closed position. One of the jaws is formed as a convex surface 9 which provides a centering bearing for the hook H when being compressed and thus tends to keep the parallel hooks in vertical alignment as the jaws close upon them. The more convex portion of the surface provides a bearing for hooks of comparatively small diameter and hooks of gradually increasing size find bearing on the outer edges of the closing recess according to their diameter. This properly seats the hooks with respect to the walls of the jaws.

Various other modifications in the method for practicing my invention may obviously be resorted to within the limits of the appended claims.

What I therefore claim and desire to secure by Letters Patent is:

1. A tire chain tool comprising a pair of pivotally crossed jaw members each terminating at its operating end in an offset bearing portion, said jaw members inwardly of said offsets having oppositely disposed wedging beaks each receivable in a recess formed in the opposite jaw member when the tool is closed, said offsets constituting abutments against which the sides of a link being opened may bear to prevent relative movement of the link on the beaks as the beaks are pressed towards each other to open the link.

2. A tire chain tool comprising a pair of pivotally crossed jaw members terminating at their operating ends in inwardly facing oppositely disposed bearing portions, a pair of overlapping wedge-shaped beaks on said jaw members adapted to open the end hooks of a tire chain, and a bearing surface inwardly of said beaks to provide bearing for said end hook in closing the same.

3. A tire chain tool comprising a pair of pivotally crossed jaw members terminating at their operating ends in inwardly facing oppositely disposed bearing portions, said jaw members inwardly of said bearing portions having overlapping oppositely disposed wedging beaks, receiving recesses on said jaw members adapted to receive said wedging beaks, said bearing portions constituting shoulder abutments adapted to bear against and close the hooked ends of a hook supported on said beaks when the jaw members are pushed towards each other, and said jaw members inwardly of said wedging beaks being disposed to form a pair of hook closing jaw surfaces disposed in cooperative relation, one of said surfaces being convex longitudinally of the jaw to provide bearing for hooks of varying diameter to be worked upon.

In testimony whereof I affix my signature.

JOHN N. MACDONALD.